(12) United States Patent
Matthias et al.

(10) Patent No.: US 12,497,053 B2
(45) Date of Patent: Dec. 16, 2025

(54) ATTENTION LEVEL DETERMINATION

(71) Applicant: JAGUAR LAND ROVER LIMITED, Warwickshire (GB)

(72) Inventors: Rebecca Matthias, Warwickshire (GB); Lee Skrypchuk, Warwickshire (GB); Alexandros Mouzakitis, Warwickshire (GR); Yifan Zhao, Bedfordshire (GB); Xiangjun Peng, Bedfordshire (GB); Chen Lv, Bedfordshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 1076 days.

(21) Appl. No.: 17/594,115

(22) PCT Filed: Apr. 2, 2020

(86) PCT No.: PCT/EP2020/059448
§ 371 (c)(1),
(2) Date: Oct. 1, 2021

(87) PCT Pub. No.: WO2020/201451
PCT Pub. Date: Oct. 8, 2020

(65) Prior Publication Data
US 2022/0153282 A1     May 19, 2022

(30) Foreign Application Priority Data
Apr. 2, 2019   (GB) ...................................... 1904590

(51) Int. Cl.
*B60W 40/09*     (2012.01)
*A61B 5/11*      (2006.01)
(Continued)

(52) U.S. Cl.
CPC ............... *B60W 40/09* (2013.01); *A61B 5/11* (2013.01); *A61B 5/168* (2013.01); *A61B 5/18* (2013.01);
(Continued)

(58) Field of Classification Search
CPC ............... B60W 40/09; B60W 30/182; B60W 2540/229; B60W 2040/0818;
(Continued)

(56) References Cited

U.S. PATENT DOCUMENTS 9,196,239 B1    11/2015   Taylor et al.
2015/0186714 A1  7/2015   Ren et al.
(Continued)

FOREIGN PATENT DOCUMENTS

EP    1968006 A1    9/2008
EP    2000889 A2    12/2008
(Continued)

OTHER PUBLICATIONS

Great Britain Intellectual Property Office, Combined Search and Examination Report under Sections 17 and 18(3) Issued in Application No. GB1904590.5, Sep. 23, 2019, 7 pages.
(Continued)

*Primary Examiner* — Aryan E Weisenfeld
(74) *Attorney, Agent, or Firm* — McCoy Russell LLP

(57) ABSTRACT

Aspects of the present disclosure relate to a control system, a system, a method, a vehicle and a non-transitory computer readable medium for receiving user movement data indicative of movement of a user's head; receiving object movement data indicative of movement of an object, the object being associated with a non-driving task; determining one or more relative movement parameters indicative of the relative movement of the user's head with respect to the object based at least in part on the received user movement data and
(Continued)

the object movement data; and determining an attention level of the user to the non-driving task based at least in part on the determined relative movement parameter.

18 Claims, 8 Drawing Sheets

(51) Int. Cl.
*A61B 5/16* (2006.01)
*A61B 5/18* (2006.01)
*B60W 30/182* (2020.01)
*G06T 7/20* (2017.01)
*G06V 20/59* (2022.01)
*B60W 40/08* (2012.01)
*B60W 50/00* (2006.01)

(52) U.S. Cl.
CPC ............ *B60W 30/182* (2013.01); *G06T 7/20* (2013.01); *G06V 20/597* (2022.01); *B60W 2040/0818* (2013.01); *B60W 2050/0029* (2013.01); *B60W 2420/403* (2013.01); *B60W 2540/229* (2020.02); *G06T 2207/30196* (2013.01); *G06T 2207/30268* (2013.01)

(58) Field of Classification Search
CPC .... B60W 2050/0029; B60W 2420/403; G06V 20/597; A61B 5/11; A61B 5/168; A61B 5/18; G06T 7/20
See application file for complete search history.

(56) References Cited

U.S. PATENT DOCUMENTS

2018/0126901 A1* 5/2018 Levkova ............... B60W 40/09
2018/0173974 A1 6/2018 Chang et al.

FOREIGN PATENT DOCUMENTS

| EP | 3088270 A1 | 11/2016 |
| WO | 2007145566 A1 | 12/2007 |
| WO | 2016161954 A1 | 10/2016 |
| WO | 2019137137 A1 | 7/2019 |

OTHER PUBLICATIONS

ISA European Patent Office, International Search Report and Written Opinion Issued in Application No. PCT/EP2020/059448, Jul. 15, 2020, WIPO, 16 pages.

* cited by examiner

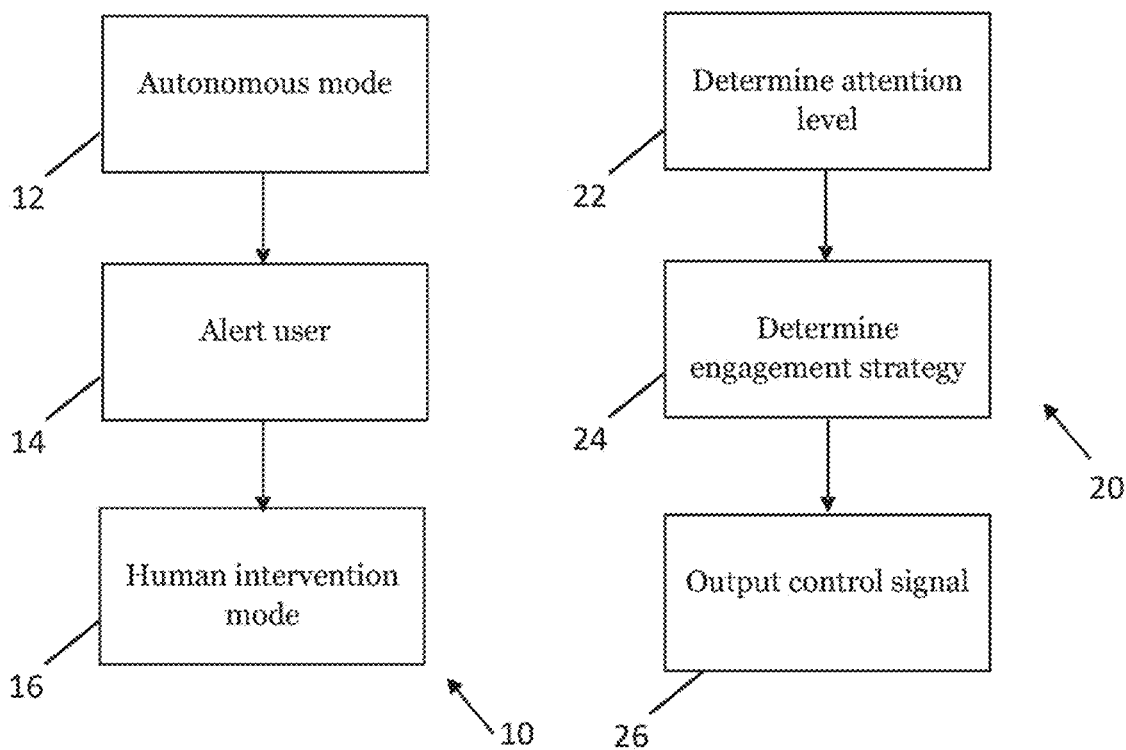
Fig. 1
Fig. 2
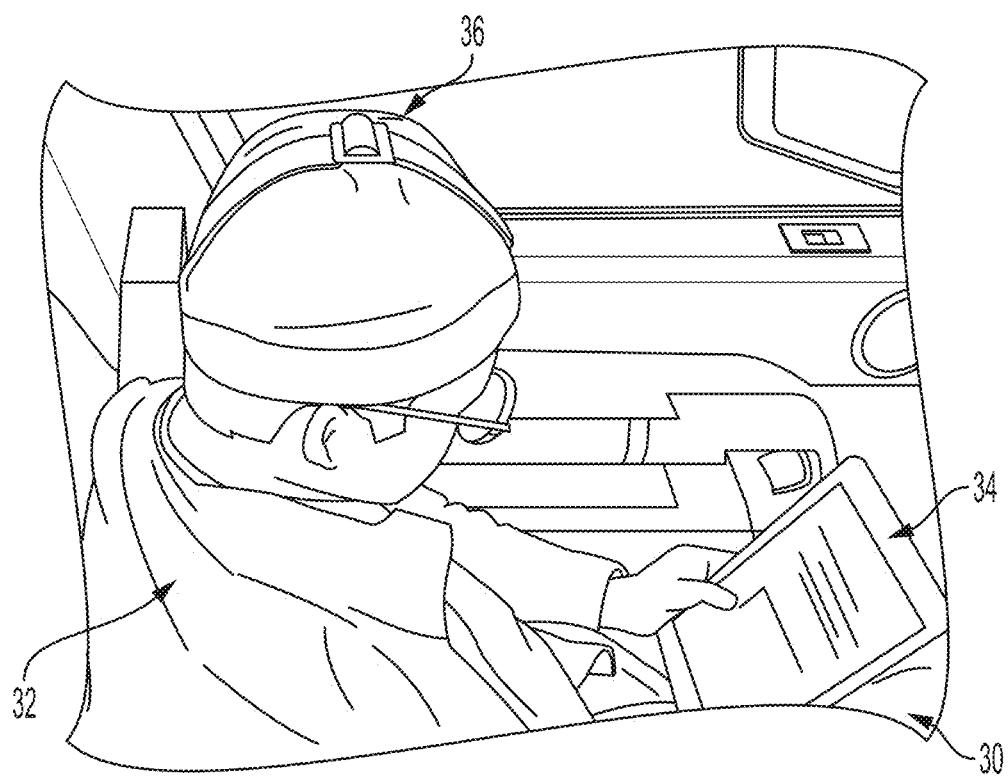
Fig. 3 ns, the control system 40 in dependence on the received user movement data and the
ATTENTION LEVEL DETERMINATION

CROSS REFERENCE TO RELATED APPLICATIONS

The present application is a U.S. National Phase of International Application No. PCT/EP2020/059448 entitled "ATTENTION LEVEL DETERMINATION," and filed on Apr. 2, 2020. International Application No. PCT/EP2020/059448 claims priority to Great Britain Patent Application No. 1904590.5 filed on Apr. 2, 2019. The entire contents of each of the above-listed applications are hereby incorporated by reference for all purposes.

TECHNICAL FIELD

The present disclosure relates to a control system, control method and to a control system and method for determining an attention level. Aspects of the disclosure further relate to a control system for a vehicle, a system, a method, a vehicle and a non-transitory computer readable medium.

BACKGROUND

It is known to provide a control system for a vehicle in which a user is instructed, under certain circumstances, to engage (e.g re-engage) with a driving task. For example, in the context of a vehicle operating in an autonomous mode, a human driver may take control of the vehicle in response to a request to intervene. There remains a need for alternative systems in this field.

SUMMARY

Aspects and embodiments of the disclosure provide a control system, a system, a method, a vehicle and a non-transitory computer readable medium.

According to an aspect of the present disclosure there is provided a control system for a platform, the control system comprising one or more controllers, the control system being configured to: receive user movement data indicative of movement of a user's head; receive object movement data indicative of movement of an object; determine one or more relative movement parameters indicative of the relative movement of the user's head with respect to the object in dependence on the received user movement data and the object movement data; determine an attention level of the user interacting with the object in dependence on the determined relative movement parameter; and output a control signal to one or more platform systems for controlling the platform in dependence on the determined attention level.

According to an aspect of the present disclosure there is provided a control system for a vehicle (e.g. a driver attention detection/determination module), the control system comprising one or more controllers, the control system being configured to: receive user movement data indicative of movement of a user's head; receive object movement data indicative of movement of an object, the object being associated with a non-driving task; determine one or more relative movement parameters indicative of the relative movement of the user's head with respect to the object in dependence on the received user movement data and the object movement data; determine an attention level of the user to the non-driving task in dependence on the determined relative movement parameter, and output a control signal to one or more vehicle systems for controlling the vehicle in dependence on the determined attention level.

The one or more controllers may collectively comprise: at least one electronic processor having one or more electrical inputs for receiving the user movement data and/or the object movement data; and at least one electronic memory device coupled to the at least one electronic processor and having instructions stored therein; and wherein the at least one electronic processor is configured to access the at least one memory device and execute the instructions thereon so as to determine the attention level of the user to the non-driving task.

According to another aspect of the present disclosure there is provided a control system for a vehicle (e.g. a driver attention detection/determination module), the control system comprising: means for receiving user movement data indicative of movement of a user's head; means for receiving object movement data indicative of movement of an object, the object being associated with a non-driving task; means for determining one or more relative movement parameters indicative of the relative movement of the user's head with respect to the object in dependence on the received user movement data and the object movement data; and means for determining an attention level of the user to the non-driving task in dependence on the determined relative movement parameter.

According to a further aspect of the present disclosure there is provided a system comprising a control system as set out above and further comprising one or more sensors and a vehicle engine control unit and/or an advanced driver-assistance system (ADAS) controller.

According to yet another aspect of the present disclosure, there is provide a vehicle comprising a control system or a system as set out above.

According to an aspect of the present disclosure there is provided a method for controlling a platform, the method comprising: receiving user movement data indicative of movement of a user's head; receiving object movement data indicative of movement of an object; determining one or more relative movement parameters indicative of the relative movement of the user's head with respect to the object in dependence on the received user movement data and the object movement data; determining an attention level of the user interacting with the object in dependence on the determined relative movement parameter; and outputting a control signal to one or more platform systems for controlling the platform in dependence on the determined attention level.

According to a further aspect of the present disclosure, there is provided a method for controlling a vehicle, the method comprising: receiving user movement data indicative of movement of a user's head; receiving object movement data indicative of movement of an object, the object being associated with a non-driving task; determining one or more relative movement parameters indicative of the relative movement of the user's head with respect to the object in dependence on the received user movement data and the object movement data; determining an attention level of the user to the non-driving task in dependence on the determined relative movement parameter; and outputting a control signal to one or more vehicle systems for controlling the vehicle in dependence on the determined attention level.

According to another aspect of the present disclosure, there is provided a computer readable medium (e.g. a non-transitory computer-readable medium) comprising computer readable instructions that, when executed by a processor, cause performance of: receiving user movement data indicative of movement of a user's head; receiving object movement data indicative of movement of an object, the object being associated with a non-driving task; determining one or more relative movement parameters indicative of the relative movement of the user's head with respect to the object in dependence on the received user movement data and the object movement data; and determining an attention level of the user to the non-driving task in dependence on the determined relative movement parameter.

In an embodiment, the control system or method is configured to: determine a type of non-driving task; and select a user movement model based on the type of non-driving task (such as reading a book, playing a game etc.), wherein the attention level is determined based on the user movement model. The type of non-driving task may be determined depending on movement data and/or other sensor data.

Optionally, the disclosure may involve determining a control strategy for engaging (e.g. re-engaging) the user with a driving task (e.g. in the event that the vehicle is operating in an autonomous mode) in dependence on the determined attention level. Thus, the determined attention of the user on the non-driving task may be used in determining how best to seek to engage (or re-engage) the user with the driving task. For example, if the user is determined to have a high attention level to the non-driving task, then greater visual/audio/haptic cues may be used to (re)engage the user with the driving task.

A control signal indicative of the determined control strategy may be output to one or more vehicle systems for controlling the one or more vehicle systems in accordance with the determined control strategy for engaging the user with the driving task.

The one or more relative movement parameters may comprise a time delay and/or a correlation strength between an object movement and a corresponding user movement. The time delay and or the correlation strength may be determined for the received data. In one example embodiment, the attention level is determined to be high when the time delay is below a first predetermined time value and/or when the correlation strength is above a first predetermined correlation value. Alternatively, or in addition, the attention level may be determined to be low when the time delay is above a second predetermined time value and/or when the correlation strength is below a second predetermined correlation value.

Optionally, the attention level may be generated by a machine-learning model based on the time delay and/or the correlation strength. A machine-learning model may be trained on the basis of ground-truth data during a training phase.

The user movement data may be received from one or more first sensors (such as orientation-based motion sensors or image sensors) and the object movement data may be received from one or more second sensors (such as orientation-based motion sensors or image sensors). The one or more first sensors may be attached to the user's head and the one or more second sensors may be attached to the object. Optionally, the one or more first sensors and/or the one or more second sensors may be image sensors (e.g. comprised in one or more cameras).

In some embodiments, the movement of the user's head comprises movements along or about one or more axes. Example axes include one or more of a nodding axis, a shaking axis, and a rolling axis. A nodding axis may relate to pitch (e.g. up and down sagittal plane movement). A shaking axis may relate to year (e.g. right and left horizontal plane movement). A rolling axis may relate to roll (e.g. up and down front plane movement).

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs and in the following description and drawings, and the individual features thereof, may be taken independently or in any combination. That is, all embodiments and/or features of any embodiment can be combined in any way and/or combination, unless such features are incompatible.

BRIEF DESCRIPTION OF THE FIGURES

One or more embodiments of the disclosure will now be described, by way of example only, with reference to the accompanying schematic drawings, in which:

FIG. 1 shows a flow chart illustrating an algorithm in accordance with an embodiment of the disclosure;

FIG. 2 shows a flow chart illustrating an algorithm in accordance with an embodiment of the disclosure;

FIG. 3 shows a system in which the present disclosure may be used;

DETAILED DESCRIPTION

Figure 4:
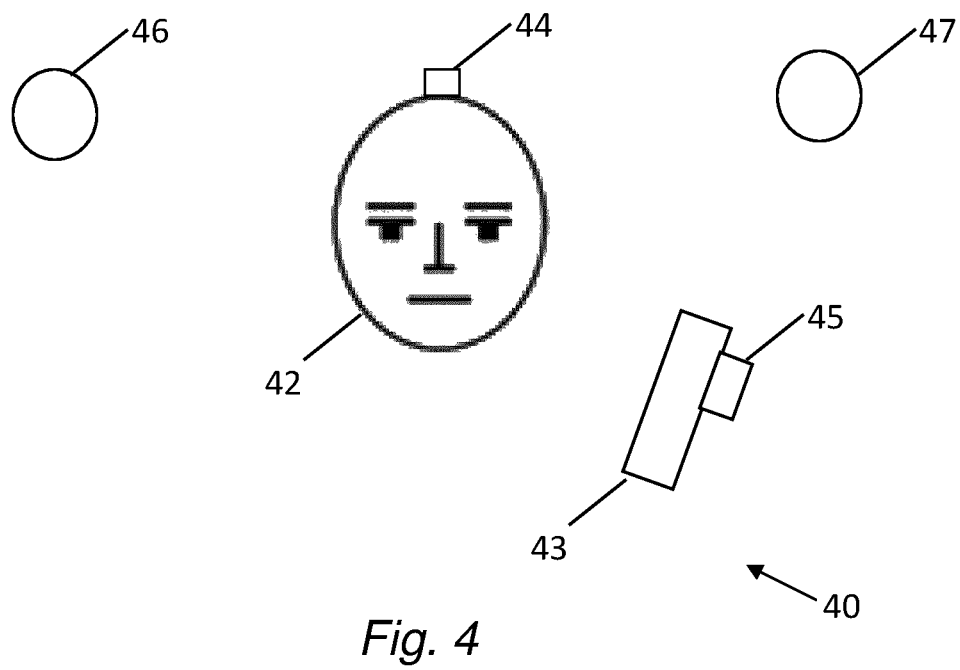
FIG. 4 shows a schematic block diagram of a system in accordance with an embodiment of the disclosure.

Vehicles, such as cars, are becoming increasingly autonomous. Vehicle autonomy can be described as having a number of different levels. The levels of autonomy may be defined as follows (although many other autonomy level descriptions and scales will be apparent to those of ordinary skill in the art):

Level 0: driver-only driving.
Level 1: driver assistance, in which a computer-controlled system may assist with certain tasks, such as acceleration or steering, in specific modes of operation.
Level 2: partial automation, in which a computer-controlled system controls both steering and acceleration in specific modes of operation (such as automatic parking modes).
Level 3: high automation, in which a computer-controlled system performs all aspect of driving, with the expectation that a human driver will respond to a request to intervene when required. Thus, the human driver must be ready to intervene at all times.
Level 4: full automation, in which the computer-controlled system performs all aspects of the driving task in a defined use case (such as highway driving or parking scenarios). The human driver will not be required to intervene during such defined use cases.
Level 5: autonomous driving, in which the computer-controlled system performs all driving tasks under all conditions. The human driver will not be required to intervene at any time.

FIG. 1 shows a flow chart illustrating an algorithm, indicated generally by the reference numeral 10, in accordance with an embodiment of the disclosure. The algorithm 10 starts at operation 12, where a vehicle is being operated in an autonomous mode. The vehicle may, for example, be operated in level 3 on the autonomous driving scale described above such that a computer-controlled system is performing all aspects of driving, with the expectation that a human driver will respond to a request to intervene when required.

At operation 14, it is determined that the human user should take control of the vehicle. This may be because the usage conditions for the autonomous mode of operation for the vehicle are not met (e.g. due to traffic conditions). At operation 14, an alert is provided to the human user, indicating that control is to be passed to the human user.

At operation 16 of the algorithm 10, the vehicle is being operated in a human intervention mode (for example, in any one of levels 0 to 2 on the autonomous driving scale described above).

FIG. 2 shows a flow chart illustrating an algorithm, indicated generally by the reference numeral 20, in accordance with an embodiment of the disclosure, in which the state of the human user in the transition from the autonomous mode (operation 12) to the human intervention mode (operation 16) is considered (e.g. during the operation 14 described above). The state of the human user is an important parameter that may, for example, be relevant to the take-over response time and driving quality.

The algorithm 20 starts at operation 22, where an attention level of the user on a non-driving activity is determined. At operation 24, a strategy for engaging (or re-engaging) the user with the driving task is determined. The strategy may be dependent on the attention level determined in operation 22. By way of example, the engagement strategy may involve a noise (such as an alarm) and/or a vibration. The volume of the noise and/or the intensity of the vibration may be dependent on the attention level determined in operation 22. For example, the volume and/or the intensity may be higher when the user's attention on the non-driving task is deemed to be high and may be lower when the user's attention on the non-driving task is deemed to be low. Algorithm 20 concludes with the output 26 of a control signal for controlling one or more vehicle systems in accordance with the determined engagement strategy.

Thus, in the event that a vehicle is being operated in an autonomous mode, the attention level of the human user on a non-driving task can be determined to enable an engagement strategy for engaging (or re-engaging) the user with the driving task to be determined. The engagement strategy may be a strategy for bringing a user back "in-the-loop"—for example, by reducing the user's attention level to the non-driving task, enabling the user to take manual control of the vehicle if and when required. The engagement strategy may include one or more of audio, visual and/or haptic alerts provided to the user. As described herein the intensity of the alert may be chosen in dependence on the determined attention level. Additionally or alternatively, the duration of the alert may be chosen in dependence on the determined attention level. In embodiments, the engagement strategy may comprise a time and/or distance to a transition event—e.g. a transition of the vehicle between two driving modes, such as an autonomous mode and a manual driving mode, or a driving mode having a high level of automated input to a driving mode requiring an increased level of manual input from the driver. The time and/or distance to a transition event may be chosen in dependence on the determined attention level.

FIG. 3 shows a system, indicated generally by the reference numeral 30, in which the present disclosure may be used. The system 30 shows a human user 32 engaging with an electronic device 34 (e.g. an electronic book or a tablet computer). Thus, the user 32 is engaged in a non-driving activity. The user 32 is wearing a head-mounted motion sensor 36. A similar sensor (not shown) may be provided for the electronic device 34. As described in detail below, the sensors of the system 30 may be used to determine the attention level of the user 32 on the non-driving task (e.g. the level engagement with the electronic device 34). Thus, the system 30 may enable the operation 22 of the algorithm 20 to be carried out.

FIG. 4 shows a schematic block diagram of a system, indicated generally by the reference numeral 40, in accordance with an embodiment of the disclosure, that is similar to the system 30 described above. The system 40 includes a user 42 (similar to the user 32 described above) and an electronic device 43 (similar to the electronic device 34 described above). The system 40 includes a first motion sensor 44 (such as an orientation-based motion sensor) attached to the head of the user 42, a second motion sensor 45 (such as an orientation-based motion sensor) attached to the electronic device 43, a first imaging device 46 and a second imaging device 47. The first and second imaging devices may be implemented using one or more cameras. As discussed further below, the provision of the particular sensors 44 to 47 shown in the system 40 is not essential; more, fewer and/or different sensors may be provided. For example, the user may be provided with multiple motion sensors similar to the sensor 44. Furthermore, the system may include motion sensors (but not imaging devices), imaging devices (but not position sensors) or both position sensors and imaging devices.

In an example use of the system 40, user movement data is received from one or more first sensors and object movement data is received from one or more second sensors. The first sensors may include the first position sensor 44. Alternatively, or in addition, the first sensors may include the first and/or the second imaging devices 46 and 47. Similarly, the second sensors may include the second position sensor 45. Alternatively, or in addition, the second sensors may include the first and/or the second imaging devices 46 and 47.

In the system 40, the various sensors may be used to track the relative positions of the user and the electronic device, as discussed further below. In the event that the user is fully engaged with the user device (e.g. by concentrating on reading or playing a game), any movement of the electronic device 43 will result in a movement of the user 42 (e.g. a movement of the user's head and/or eyes). Alternatively, if the user 42 is distracted, tired or has less commitment to the relevant non-driving activity, then the correlation between the head/eye movement and the electronic device movement is expected to be weaker and the time delay between electronic device movement and head/eye movement is expected to be longer.

Figure 5:
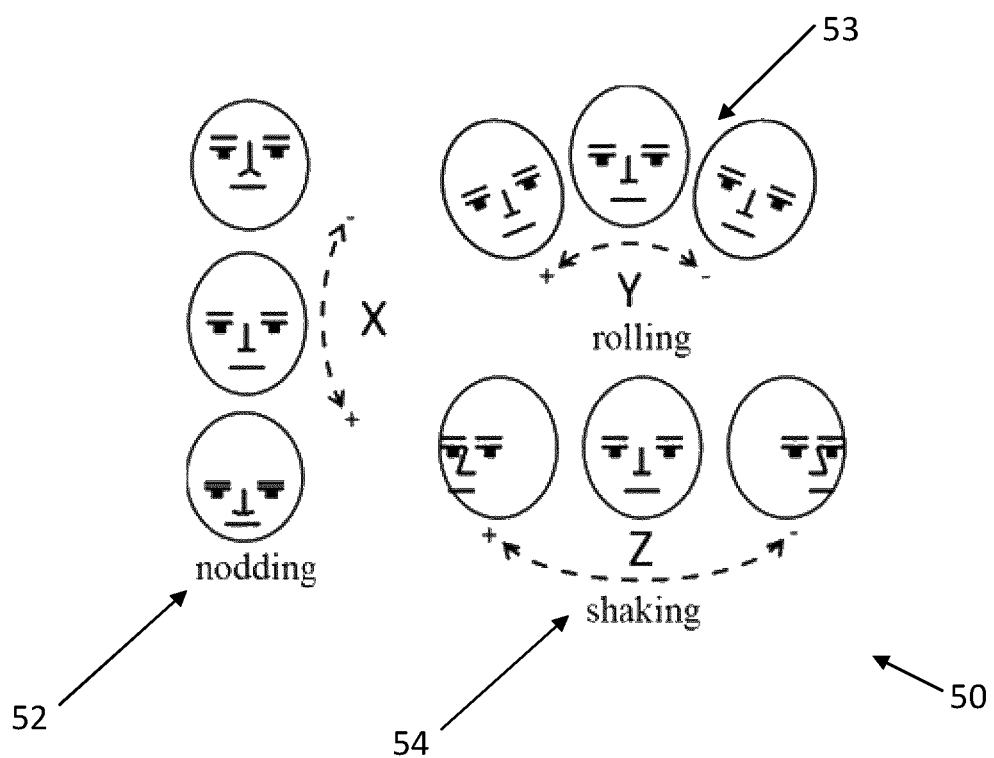
FIG. 5 shows example head movements in accordance with principles of an example of the present disclosure.

FIG. 5 shows example head movements, indicated generally by the reference numeral 50, in accordance with principles of an example of the present disclosure. The head movements 50 show example movements along different axes. For example, the head movements 50 include movement along a nodding axis 52, movement along a rolling axis 53 and movement along a shaking axis 54. The nodding axis may relate to up and down movement along a sagittal plane. The rolling axis may relate to roll (e.g. up and down front plane movement). The shaking axis may relay to yaw (e.g. right and left horizontal plane movement).

Figure 6:
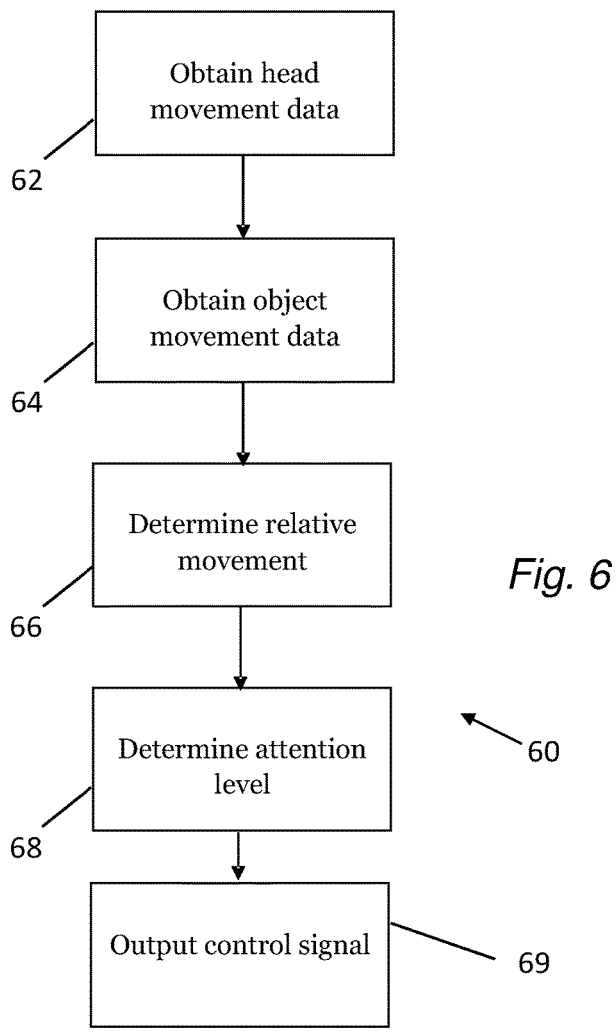
FIG. 6 shows a flow chart illustrating an algorithm in accordance with an embodiment of the disclosure.

FIG. 6 shows a flow chart illustrating an algorithm, indicated generally by the reference numeral 60, in accordance with an embodiment of the disclosure. The algorithm 60 may be implemented by a control system for a vehicle, such as a driver attention level detection module of a vehicle. The algorithm 60 is an example implementation of the operation 22 described above.

The algorithm 60 starts at operation 62, where user movement data indicative of movement of a user's head is obtained. Thus, for example, movement of the user's head 42 described above with reference to FIG. 4 may be detected. As described further below, the operation 62 may involve obtaining data relating to movement along one or more of the axes of movement described above with reference to FIG. 5.

Head movements may, for example, be detected using any of the sensors 36, 44, 46 and 47 described above. In embodiments, head-mounted sensors may be used, including three triaxle sensors for measuring acceleration, rotation speed and magnetic field respectively. The three measures were fused together by an internal logic chip that calculated the internal orientation of the system relative to a geostatic coordinate system aligned with the earth's magnetic and gravitational fields. In embodiments, two identical sensors may be used—one for the head of the user 32, 42 and one of the relevant object 34, 43.

At operation 64, object movement data indicative of movement of an object (such as the object 42) is obtained. The object is associated with a non-driving task (such as reading or playing a game). Object movement may, for example, be detected using any of the sensors 45, 46 and 47 described above.

At operation 66, one or more relative movement parameters indicative of the relative movement of the user's head with respect to the object is determined in dependence on the received user movement data and the object movement data. As described in detail below, the relative movement parameters may include the degree of correlation between the head and object movement data about a certain axis and the time delay between object movements and head movements about a certain axis.

At operation 68, an attention level of the user to the non-driving task is determined in dependence on the determined relative movement parameter(s). Finally, at operation 69, a control signal is output to one or more vehicle systems for controlling the vehicle in dependence on the determined attention level of the user to the non-driving task.

The algorithm 60 is provided by way of example. Some of the operations of the algorithm 60 could be provided in a different order. For example, the operations 62 and 64 could be reversed. The output of the algorithm 60 may be used in the algorithm 20 described above in the determination of a (re)engagement strategy.

Figure 7:
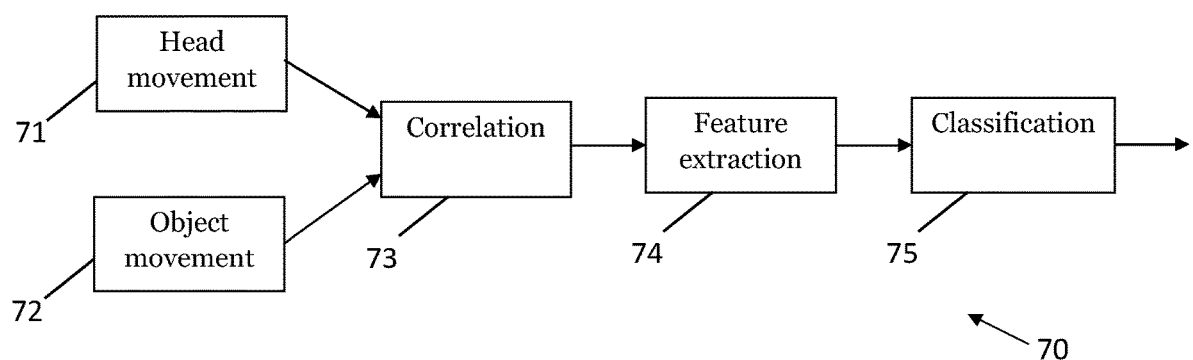
FIG. 7 shows a schematic block diagram in accordance with an embodiment of the disclosure.

FIG. 7 shows a schematic block diagram, indicated generally by the reference numeral 70, in accordance with an embodiment of the disclosure. The system 70 comprises a head movement measurement module 71, an object movement measurement module 72, a correlation estimation module 73, a feature extraction module 74 and a classification module 75. The system 70 may be used to implement the algorithm 60 described above. The classification module provides an output that may be in the form of a "high attention" indication or a "low attention" indication, thereby proving the attention level determination of the operation 68 described above (although other classification outputs, such as a range of value or high, medium and low outputs are possible).

The correlation estimation module 73 seeks to quantify the movement correlation between the head and the object (based on the data obtained from the head movement measurement module 71 and the object movement measurement module 72 respectively). Cross correlation as a function of the time lag displacement of one relative to the other is a commonly used measure of similarity between two time-series. The correlation estimation module 73 may measure the strength of correspondence between two variables with a certain time delay.

By way of example, consider two time-series $X=\{x_1, x_2, \ldots, x_n\}$ and $Y=\{y_1, y_2, \ldots, y_n\}$, where X and Y represent the movement vector of head and object respectively (as determined by the head movement measurement module 71 and the object movement module 72 respectively), and n denotes the number of sampling data. It should be noted that there may be three vectors produced in the head movement including nodding, rolling and shaking (as described above with reference to FIG. 5). This definition is also applied to the object movement. X and Y can be any vector of these three. If the system is stationary, the cross-correlation $(r_k)$ between X and Y is calculated by:

$$r_k = \frac{\sum_{i=1}^{n-k}(x_i - \bar{x})(y_{i+k} - \bar{y})}{\sqrt{\sum_{i=1}^{i=n}(x_i - \bar{x})^2(y_i - \bar{y})^2}}, k \in [-n, n],$$

where $\bar{x}$ and $\bar{y}$ are the means of X and Y respectively. If both signals are strongly associated without time delay, a peak is usually observed at k=0 and its value $r_0$, also described as correlation coefficient, can be used to quantify the association. If there is a time delay $\tau$ between two signals, for the applications with a cause-effect relationship, the value of $r_\tau$ instead of $r_0$ should be used to represent the association. Associated with this actual application, the object movement is the cause and the head movement is the effect, which means Y causes X. To mitigate the influence of noise, a maximal time lag T to limit the search range for $\tau$ may be provided.

The correlation strength ($r_{peak}$) between these two signals can be described by:

$$r_{peak} = \max_k r_k.$$

The time delay ($\tau$) is estimated by:

$$\tau = \operatorname*{argmax}_k r_k$$

where $k \in [-T, 0]$. (Only the negative value of k is considered in this example since Y always causes X.)

The equations for the correlation strength ($r_{peak}$) and time delay ($\tau$) may be sufficient if the association between the head and the object is stationary. However, the association may be time-varying, since the level of engagement can change over time due, for example, to variation of road condition, fatigue or distraction etc. To address this challenge, a sliding window technique is applied and the cross-correlation $r_k$ can be extended to:

$$r_k(t) = \frac{\sum_{i=t-\frac{H}{2}+1}^{t+\frac{H}{2}-k}(x_i - x(t))(y_{i+k} - \bar{y}(t))}{\sqrt{\sum_{i=t-\frac{H}{2}+1}^{t+H/2}(x_i - \bar{x}(t))^2(y_i - \bar{y}(t))^2}}$$

where the window size is denoted as H and $\bar{x}(t)$ and $\bar{y}(t)$ can be calculated by:

$$\bar{x}(t) = \frac{1}{H}\sum_{i=t-\frac{H}{2}+1}^{t+\frac{H}{2}} x_i; \text{ and}$$

$$\bar{y}(t) = \frac{1}{H}\sum_{i=t-\frac{H}{2}+1}^{t+\frac{H}{2}} y_i.$$

The correlation strength ($r_{peak}(t)$) and time delay ($\tau(t)$) between these two signals at time t can then be described as follows:

$$r_{peak}(t) = \max_k |r_k(t)|; \text{ and } \tau(t) = \operatorname*{argmax}_k |r_k(t)|.$$

The correlation strength ($r_{peak}(t)$) and time delay ($\tau(t)$) data are output by the correlation estimation module 73 to the feature extraction module 74.

Assuming that the data length is n, the window size is H and the step size is d, for each axis of measurement, the time-varying correlation is presented by $r_{peak}(d)$, $r_{peak}(2d)$ . . . . The boundary of correlation (t<H/2 or t>n−H/2) was discarded to ensure the same length of sampling data for each window. An alternative solution is to pad zeros to the beginning and end of signals. The data length of the extracted $r_{peak}$ and $\tau$ is $$m = \text{floor}\left(\frac{n-H}{d}\right).$$

The next step is to reduce the number of features by selecting an appropriate axis (e.g. nodding, rolling and/or shaking axes) for analysis. Experimental results suggest that not all axes have strong correlation, which is subject to the non-driving activities (NDAs). Recusing the feature can improve the classification performance.

The classification module 75 is used to classify the collected data (for example into two groups: high-level attention and low-level attention). The classification module 75 may use of a linear support vector machine (SVM) algorithm. SVM is a supervised learning algorithm that analyses data used for classification and regression analysis. Given training dataset of m points of the form (u(d), z(d)), (u(2d), z(2d)), (u(md), z(md)), where z(d) is 1 or 0, indicating the class to which the point u(d) belongs to (e.g. high-level attention or low-level attention respectively). The predictor u could be multiple dimensions (e.g. both $\tau$ and $r_{peak}$). The linear SVM aims to find out the optimal hyperplane which can separate points of two classes with largest margin.

In an example embodiment, data was collected for three participants, using the data collection arrangement described above with reference to FIG. 3. Data was collected for 10 minutes per participant. The parameters were set as T=2 s, d=10 data points (0.3125 s) and H=2000 data points (62.5 s).

To simulate non-driving activity, three participants were required to play a video game that they had not played before. High attention level was simulated by asking the participants to fully focus on the game. Low attention level was simulated through asking the participants to play the game whilst talking to other people.

Figure 8:
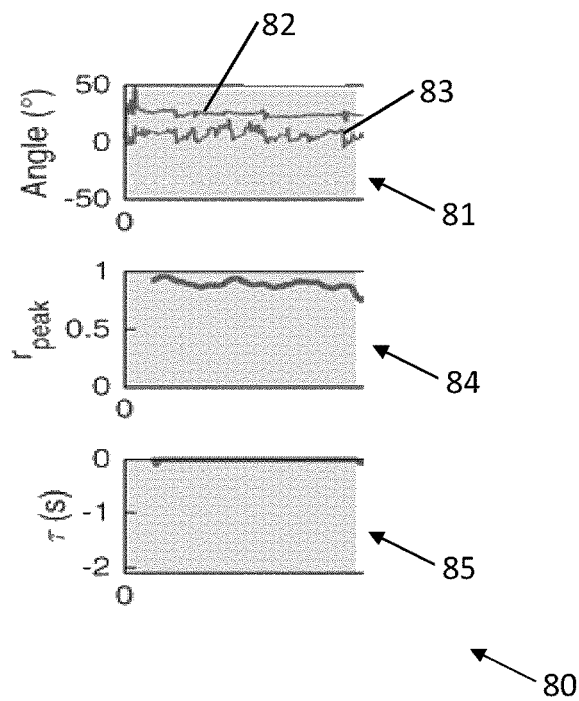
FIG. 8 shows data sets generated in accordance with an embodiment of the disclosure.

FIG. 8 shows data sets, indicated generally by the reference numeral 80, generated in accordance with an embodiment of the disclosure during a high attention level mode. The data sets 80 include movement data 81 (including head movement data 82 and object movement data 83), correlation data 84 and time delay data 85. The data sets 80 are based on measurements of the nodding axis.

The data sets 80 show movement, correlation and time delay data for a simulated high attention level time periods. The correlation data 84 shows that the correlation between the head movement data 82 and the object movement data is high (close to 1) and that the time delay data is low (close to 0).

Figure 9:
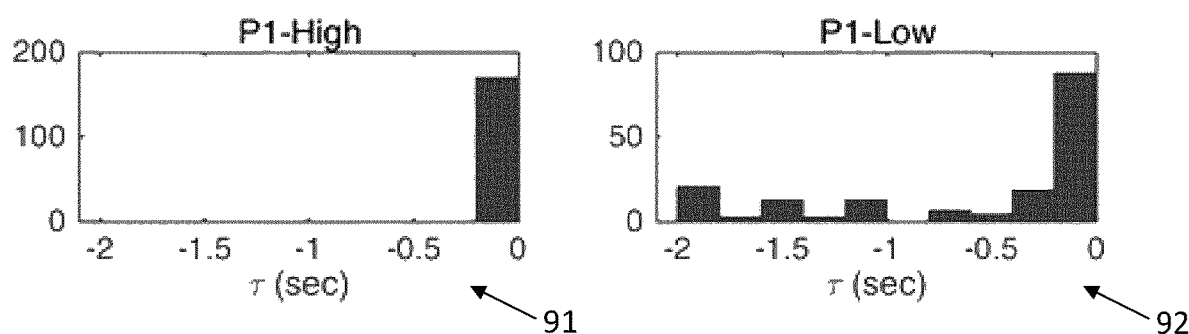
FIG. 9 shows histograms of data collected in accordance with an embodiment of the disclosure.

FIG. 9 shows two histograms, indicated generally by the reference numeral 91 and 92, of time delay data generated in high and low attention level simulation modes respectively. The histograms 91 and 92 show estimated time delay τ based on the nodding axis of the relevant user. The histogram 91 shows that for the high attention level data, almost all values of τ are closed to zero (<0.1 s) and the histogram 92 shows that for the low attention level, the values of τ are more widely spread.

Figure 10:
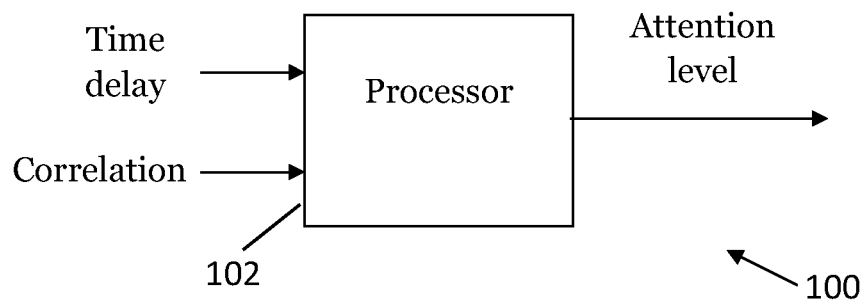
FIG. 10 shows a schematic block diagram of a system in accordance with an embodiment of the disclosure.

FIG. 10 shows a schematic block diagram of a system, indicated generally by the reference numeral 100, in accordance with an embodiment of the disclosure. The system 100 includes a processor 102 having a first input receiving time delay information, a second input receiving correlation information and an output providing an attention level indication. As discussed above with reference to FIGS. 8 and 9, correlation and time delay information are good indicators of whether a user is engaging in a non-driving task in a high-attention or low-attention mode. Accordingly, the processor 102 is able to determine an attention level of a user to a non-driving task based on time delay and correlation information.

Figure 11:
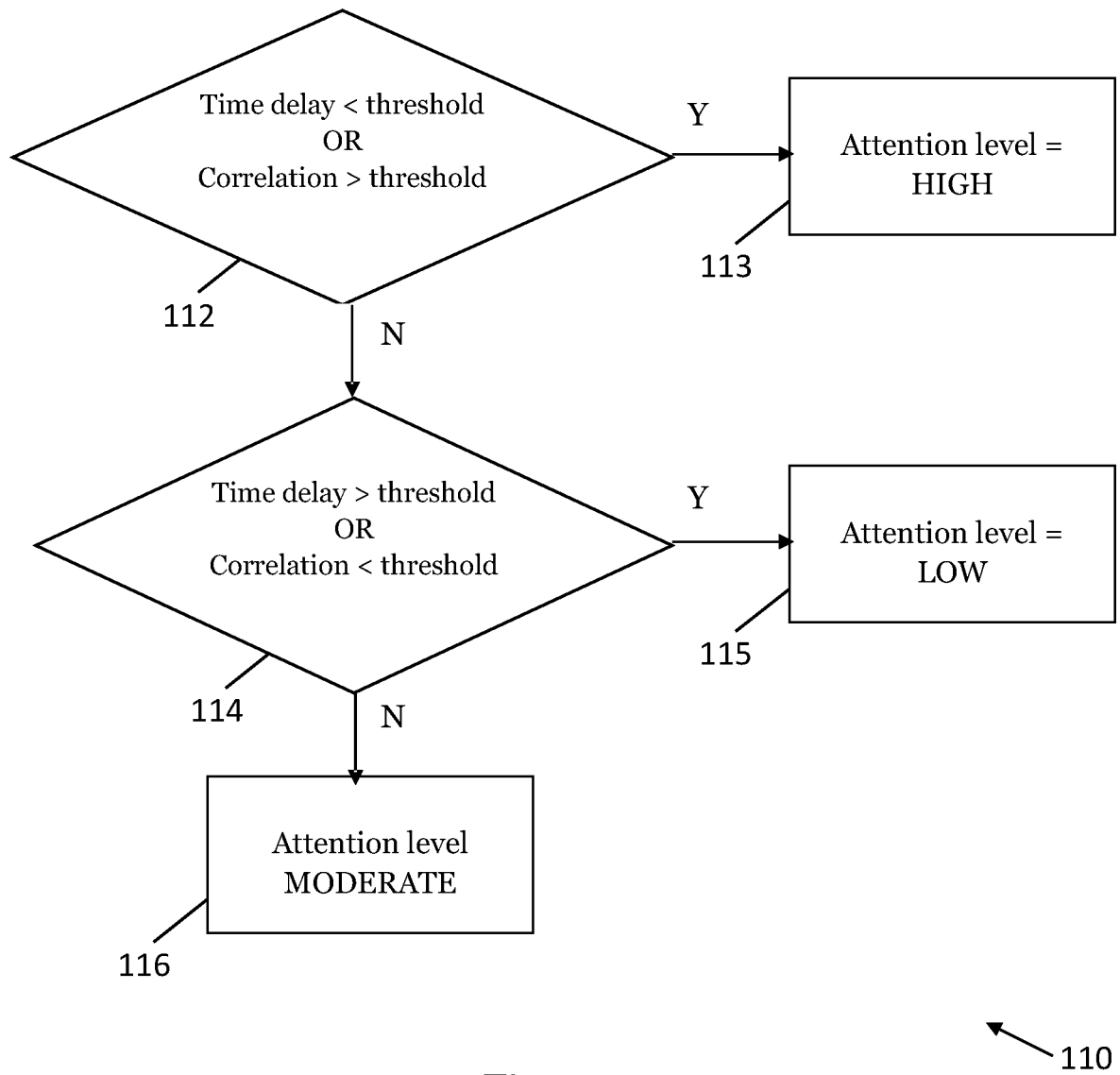
FIG. 11 shows a flow chart illustrating an algorithm in accordance with an embodiment of the disclosure.

FIG. 11 shows a flow chart illustrating an algorithm, indicated generally by the reference numeral 110, in accordance with an embodiment of the disclosure. The algorithm 110 may be implemented by the system 100 described above.

The algorithm 110 starts at operation 112 where a determination is made regarding whether a time delay is below a first predetermined time value or when the correlation strength is above a first predetermined correlation value. If so, the algorithm 110 moves to operation 113 where the attention level is deemed to be high; otherwise, the algorithm 110 moves to operation 114.

At operation 114, a determination is made regarding whether the time delay is above a second predetermined time value or the correlation strength is below a second predetermined correlation value. If so, the algorithm 110 moves to operation 115 where the attention level is deemed to be low; otherwise, the algorithm 110 moves to operation 116.

At operation 116, the attention level is deemed to be moderate. (Note that not all embodiments include a moderate attention level. Thus, in some embodiments, the operation 116 may simply terminate the algorithm 110 without setting an attention level.)

Figure 12:
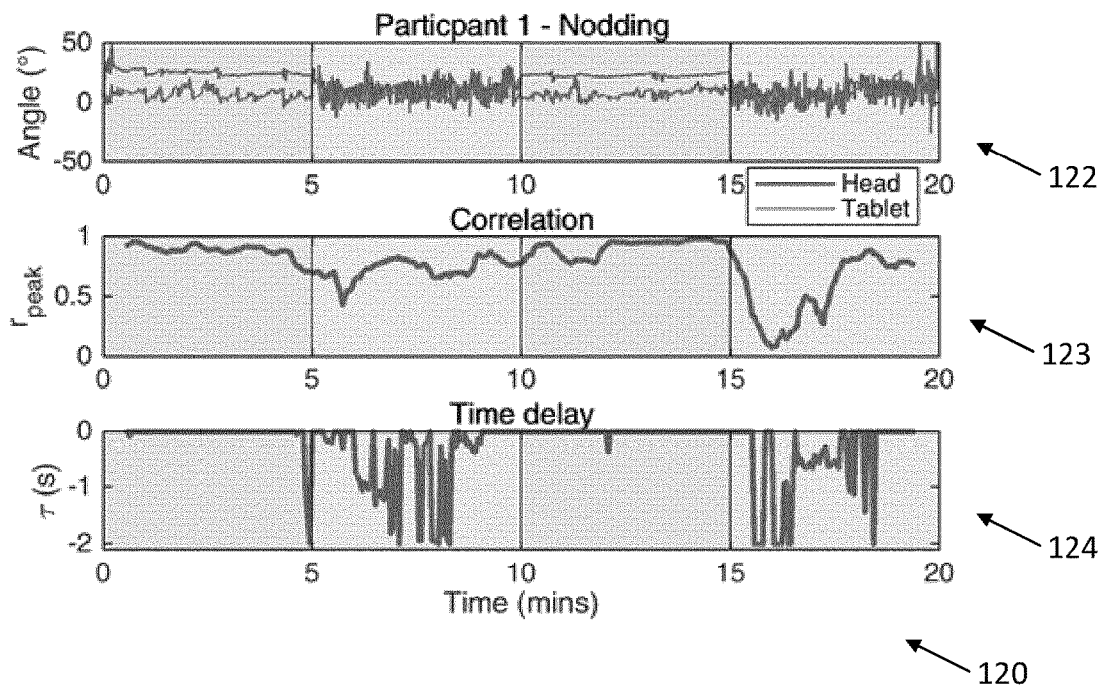
FIG. 12 shows data generated in accordance with an embodiment of the disclosure.

FIG. 12 shows data, indicated generally by the reference numeral 120, generated in accordance with an embodiment of the disclosure. The data includes movement data 122 (including head movement data and object movement data), correlation data 123 and time delay data 124. The data sets 120 are based on measurements of the nodding axis.

In the example data 80 described above, the participants' attention level is considered stationary, meaning that the participants have consistently high or low attention level across the testing period. In contrast, in the example data 120, the driver behaviour is considered non-stationary, which is closer to real applications. Specifically, the example data 120 was collected for 20 minutes and was divided into four phases of 5 minutes each. In the first phase, the user attention was high, in the second phase the user attention was low, in the third phase the user attention was high and the fourth phase the user attention was low.

As discussed above, to simulate non-driving activity data collection, three participants were required to play a video game that they had not played before. The high attention level was simulated by asking the participants to fully focus on the game. The low attention level was simulated through asking the participants to play the game whilst talking to other people.

Figure 13:
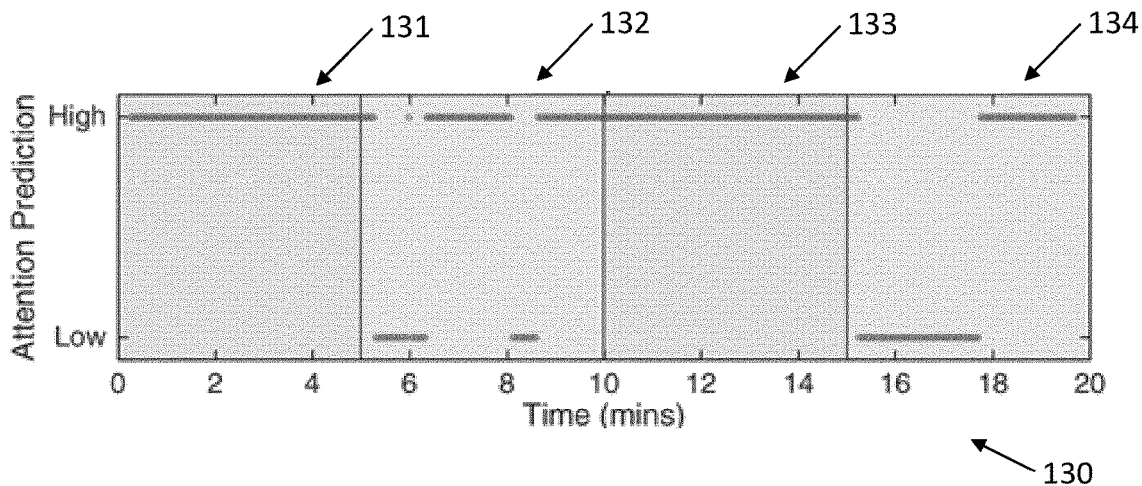
FIG. 13 shows data generated in accordance with an embodiment of the disclosure.

FIG. 13 shows data, indicated generally by the reference numeral 130, generated in accordance with an embodiment of the disclosure. The data 130 shows an attention prediction output of the algorithm 110 based on the data 120 described above with reference to FIG. 12.

The data 130 is divided into four phases 131 to 134, which phase relate to high, low, high and low attention modes respectively. As shown in FIG. 13, the algorithm 110 correctly identifies the high attention mode in the first and third phases 131 and 133, but has more difficulty in identifying the low attention mode phases 132 and 134. This, in essence, is due to false positives in the low attention mode data.

The algorithm 110 is a simple algorithm based on thresholds (hence the occurrence of false positives). More complicated algorithms will be readily apparent to those of ordinary skill in the art. For example, a threshold level may be combined with a time period such that a change in mode is only triggered in the event that the relevant threshold is met for more than a given period of time.

Figure 14:
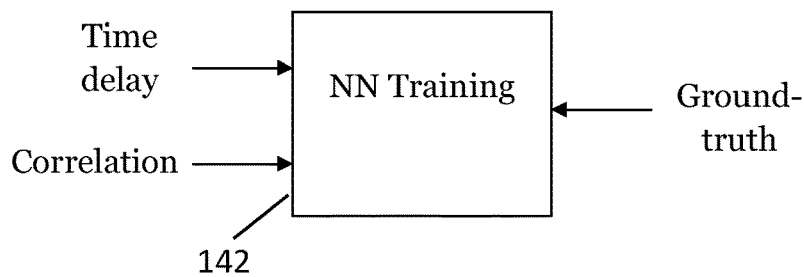
FIG. 14 shows a schematic block diagram of a system in accordance with an embodiment of the disclosure.

FIG. 14 shows a schematic block diagram of a system, indicated generally by the reference numeral 140, in accordance with an embodiment of the disclosure. The system 140 comprises a neural network training module 142. The training module 142 receives correlation and time delay data inputs (such as the data 123 and 124 described above), together with ground truth data. The ground truth data indicates the actual mode of operation (e.g. whether the received correlation and time delay data is obtained during a high attention mode or a low attention mode). On the basis of the data received at the training module 142, a neural network is trained (for example using reinforcement learning).

Figure 15:
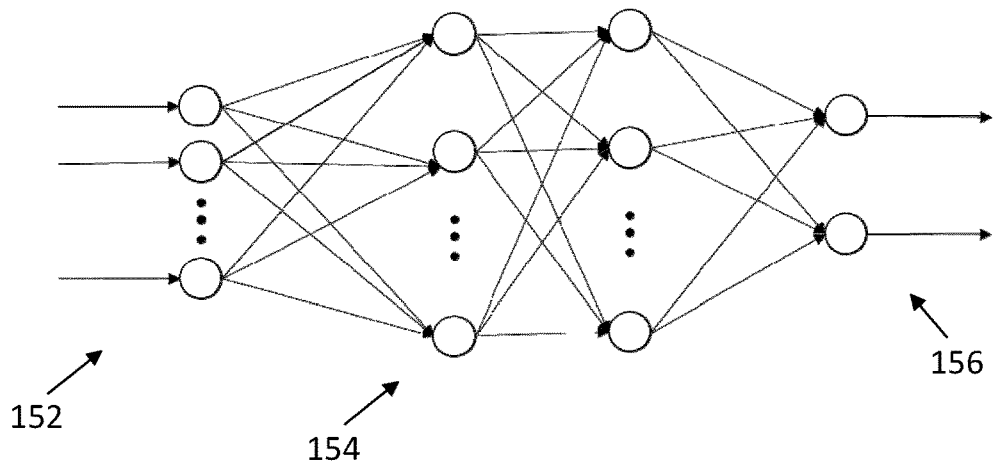
FIG. 15 shows a schematic block diagram of a neural network in accordance with an embodiment of the disclosure.

FIG. 15 shows a schematic block diagram of a neural network, indicated generally by the reference numeral 150, in accordance with an embodiment of the disclosure. The neural network 150 is a feedforward neural network including an input layer 152, one or more hidden layers 154 (a plurality of hidden layers is shown in FIG. 15) and an output layer 156. The neural network 150 could be used to implement the processor 102 described above.

The neural network (or some other machine-learning model) may be used to generate an attention level indication based on received time delay and/or the correlation strength data. The neural network 150 may be trained by the training module 142 described above.

The neural network 150 comprises a plurality of network nodes. The input layer 152 includes a plurality of nodes, each receiving an input. For example, the nodes of the input layer may receive data from a plurality of sensors or may receive the time delay and correlation data referred to above. Each node of the input layer provides an output to a plurality of nodes of a first hidden layer. After one or more hidden layers (two are shown in FIG. 15 by way of example), the outputs of the nodes of the last hidden layer are provided to one or more nodes of an output layer. Each node of the output layer provides an output of the neural network. As is well known in the art, the couplings between the nodes of the neural network 150 include weights that are typically adjustable.

The various nodes of the neural network 150 are trainable by changing the relative weights of each node. As is well known in the art, given a large set of training data, the neural network 150 can be trained to provide suitable outputs given a set of inputs.

The neural network 150 is provided by way of example only. Many alternative neural networks or machine-learned algorithms could be used.

In one form of the disclosure, the training module 142 is configured to: receive user movement data indicative of movement of a user's head; receive object movement data indicative of movement of an object, the object being associated with a non-driving task; determine a relative movement parameter indicative of the relative movement of the user's head with respect to the object in dependence on the received user movement data and the object movement data; determine an attention level of the user to the non-driving task in dependence on the determined relative movement parameter; generate a comparison between the determined attention level of the user and a known attention level (e.g. the ground-truth referred to above); and train a model for determining the attention level based on the generated comparison. The control system may be configured to perform a training based on a machine-learning model.

Figure 16:
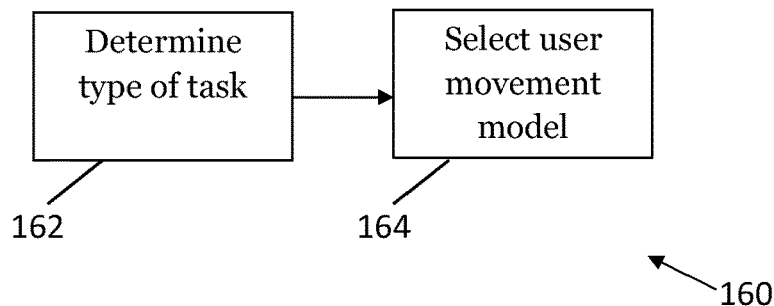
FIG. 16 shows a flow chart illustrating an algorithm in accordance with an embodiment of the disclosure.

FIG. 16 shows a flow chart illustrating an algorithm, indicated generally by the reference numeral 160, in accordance with an embodiment of the disclosure. The algorithm 160 starts at operation 162 where a type of non-driving task is determined. By way of example, the type of non-driving task (such as reading, playing a game, talking, sleeping etc.) may be determined in dependence on movement data and/or other sensor data. Next, at operation 164, a movement model is selected based on the type of non-driving task. For example, a movement model may be selected to determine movement about a specific axis relating to a particular type of non-driving task. The attention level discussed elsewhere in this document may be determined based on the user movement model selected in operation 164.

Figure 17:
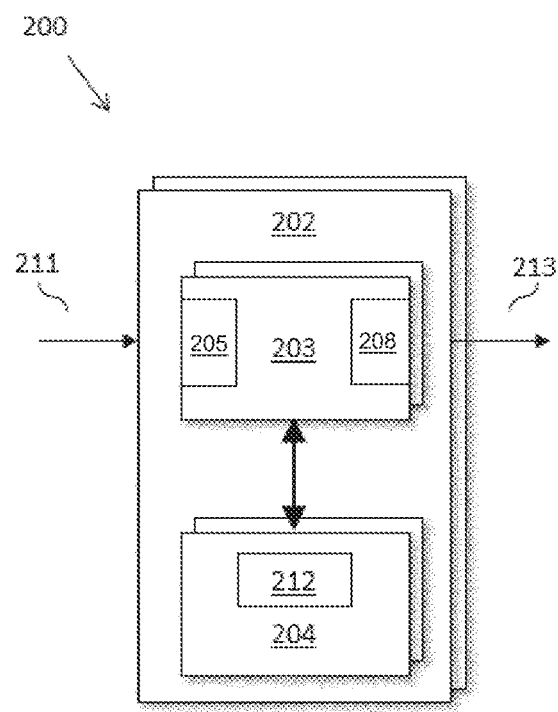
FIG. 17 shows a schematic block diagram of components of a system in accordance with an embodiment of the disclosure.

With reference to FIG. 17, there is illustrated a simplified example of a control system 200 such as may be adapted to implement the methods described above. The control system 200 comprises one or more controllers 202 and is configured to receive user movement data indicative of movement of a user's head; receive object movement data indicative of movement of an object, the object being associated with a non-driving task; determine one or more relative movement parameters indicative of the relative movement of the user's head with respect to the object in dependence on the received user movement data and the object movement data; determine an attention level of the user to the non-driving task in dependence on the determined relative movement parameter; and output a control signal to one or more vehicle systems for controlling the vehicle in dependence on the determined attention level.

It is to be understood that the or each controller 202 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 202 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 202 to implement the control techniques described herein (including some or all of the functionality required for the method described herein). The set of instructions could be embedded in said one or more electronic processors of the controller 202; or alternatively, the set of instructions could be provided as software to be executed in the controller 202. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 17, the or each controller 202 comprises at least one electronic processor 203 having one or more electrical input(s) 205 for receiving user movement data and/or object movement data 211, and one or more electrical output(s) 208 for outputting a control signal 213. The or each controller 202 further comprises at least one memory device 204 electrically coupled to the at least one electronic processor 203 and having instructions 212 stored therein. The at least one electronic processor 203 is configured to access the at least one memory device 204 and execute the instructions 212 thereon so as to determine the attention level of the user to the non-driving task.

The, or each, electronic processor 203 may comprise any suitable electronic processor (e.g., a microprocessor, a microcontroller, an ASIC, etc.) that is configured to execute electronic instructions. The, or each, electronic memory device 204 may comprise any suitable memory device and may store a variety of data, information, threshold value(s), lookup tables or other data structures, and/or instructions therein or thereon. In an embodiment, the memory device 204 has information and instructions for software, firmware, programs, algorithms, scripts, applications, etc. stored therein or thereon that may govern all or part of the methodology described herein. The processor, or each, electronic processor 203 may access the memory device 204 and execute and/or use that or those instructions and information to carry out or perform some or all of the functionality and methodology describe herein.

The at least one memory device 204 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 202 have been described comprising at least one electronic processor 203 configured to execute electronic instructions stored within at least one memory device 204, which when executed causes the electronic processor(s) 203 to carry out the method as hereinbefore described. However, it will be appreciated that embodiments of the present disclosure can be realised in any suitable form of hardware, software or a combination of hardware and software. For example, it is contemplated that the present disclosure is not limited to being implemented by way of programmable processing devices, and that at least some of, and in some embodiments all of, the functionality and or method steps of the present disclosure may equally be implemented by way of non-programmable hardware, such as by way of non-programmable ASIC, Boolean logic circuitry, etc.

Figure 18:
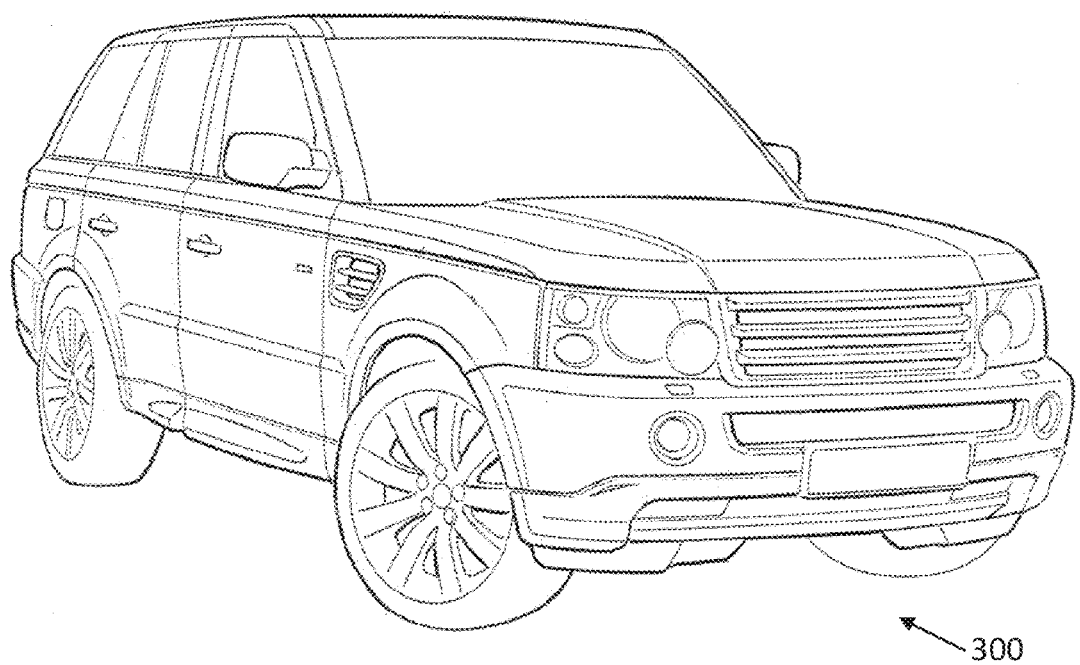
FIG. 18 shows a vehicle in accordance with an embodiment of the disclosure.

FIG. 18 shows a vehicle, indicated generally by the reference numeral 300, in accordance with an embodiment of the disclosure. The methods of one or more of the algorithms 10, 20, 60, 110 and 160 may be performed at vehicle 300.

Although described with reference to a vehicle, it will be appreciated that the control system, system and methods disclosed herein are equally applicable to any system or platform operable in both autonomous and manual modes where a user may be required to interact with the system/platform intermittently.

It will be appreciated that various changes and modifications can be made to the present disclosure without departing from the scope of the present application. Variations and modifications will be apparent to persons skilled in the art.

Moreover, the present specification should be understood to include any novel features or any novel combination of features either explicitly or implicitly disclosed herein or any generalisation thereof.

The invention claimed is:

1. A control system for a vehicle, the control system comprising one or more controllers, the control system being configured to:
   receive user movement data indicative of movement of a user's head;
   receive object movement data indicative of movement of an object, the object being associated with a non-driving task;
   determine one or more relative movement parameters indicative of the relative movement of the user's head with respect to the object based at least in part on the received user movement data and the object movement data, wherein determining the one or more relative movement parameters comprises:
      calculating a cross-correlation between the user movement data and the object movement data as a function of time lag displacement;
      determining a correlation strength based on a peak value of the cross-correlation; and
      determining a time delay between the object movement and corresponding user head movement based on the time lag displacement at the peak value;
   determine an attention level of the user to the non-driving task based at least in part on the determined one or more relative movement parameters; and
   output a control signal to one or more vehicle systems for controlling the vehicle based at least in part on the determined attention level of the user.

2. The control system according to claim 1, the control system configured to:
   determine a type of non-driving task; and
   select a user movement model based on the type of non-driving task, wherein the attention level is determined based on the user movement model.

3. The control system according to claim 1, the control system configured to:
   determine a control strategy for engaging the user with a driving task based at least in part on the determined attention level of the user; and
   output a control signal indicative of the determined control strategy to one or more vehicle systems for controlling the one or more vehicle systems in accordance with the determined control strategy for engaging the user with the driving task.

4. The control system according to claim 1, wherein the attention level is determined to be high when the time delay is below a first predetermined time value and/or when the correlation strength is above a first predetermined correlation value.

5. The control system according to claim 1, wherein the attention level is determined to be low when the time delay is above a second predetermined time value and/or when the correlation strength is below a second predetermined correlation value.

6. The control system according to claim 1, wherein the attention level is generated by a machine-learning model based on the time delay and/or the correlation strength.

7. The control system according to claim 1, wherein the user movement data is received from one or more first sensors and the object movement data is received from one or more second sensors.

8. The control system according to claim 7, wherein any or all of the one or more first sensors and the one or more second sensors comprise orientation-based motion sensors.

9. The control system according to claim 7, wherein any or all of the one or more first sensors and the one or more second sensors comprise image sensors.

10. The control system according to claim 1, wherein the movement of the user's head comprises movements along or about one or more axes.

11. The control system according to claim 10, wherein the axes comprise one or more of the group consisting of: a nodding axis, a shaking axis, and a rolling axis.

12. A method for controlling a vehicle, the method comprising:
   receiving:
   receiving user movement data indicative of movement of a user's head;
   receiving object movement data indicative of movement of an object, the object being associated with a non-driving task;
   determining one or more relative movement parameters indicative of relative movement of the user's head with respect to the object based at least in part on the received user movement data and the received object movement data, wherein determining the one or more relative movement parameters comprises:
      calculating a time-varying correlation strength between the user's head movement and object movement; and
      determining a time delay between object movements and corresponding head movements for multiple time windows;
   determining an attention level of the user to the non-driving task based on both the correlation strength and time delay values across the multiple time windows; and
   outputting a control signal to one or more vehicle systems for controlling the vehicle based at least in part on the determined attention level of the user.

13. The method according to claim 12, comprising:
   determining a control strategy for engaging the user with a driving task based at least in part on the determined attention level of the user; and
   outputting a control signal indicative of the determined control strategy to one or more vehicle systems for controlling the one or more vehicle systems in accordance with the determined control strategy for engaging the user with the driving task.

14. The method according to claim 12, comprising:
   determining a type of non-driving task;
   selecting a user movement model based on the type of non-driving task, wherein the attention level is determined in based on the user movement model.

15. The method according to claim 12, wherein the attention level is generated by a machine-learning model based on the time delay and/or the correlation strength.

16. The method according to claim 12, wherein the movement of the user's head comprises movements along or about one or more axes.

17. The control system according to claim 1, wherein the control system is implemented within a vehicle.

18. A tangible, non-transitory computer readable medium storing computer readable instructions that, when executed by a processor, cause the processor to perform the method of claim 12.

* * * * *